(12) United States Patent
Mykolayovych et al.

(10) Patent No.: US 11,483,787 B2
(45) Date of Patent: Oct. 25, 2022

(54) METHOD FOR SYNCHRONIZING SENSORS OF A SECURITY SYSTEM (VARIANTS)

(71) Applicants: Tantsiura Oleksandr Mykolayovych, Kyiv (UA); Piannikov Serhii Dmytrovych, Kyiv (UA); Konotopskyi Oleksandr Volodymyrovych, Sharjah (AE)

(72) Inventors: Tantsiura Oleksandr Mykolayovych, Kyiv (UA); Piannikov Serhii Dmytrovych, Kyiv (UA); Konotopskyi Oleksandr Volodymyrovych, Sharjah (AE)

(73) Assignee: AJAX SYSTEMS CYPRUS HOLDINGS LTD, Nicosia (CY)

( * ) Notice: Subject to any disclaimer, the term of this patent is extended or adjusted under 35 U.S.C. 154(b) by 36 days.

(21) Appl. No.: 17/194,804

(22) Filed: Mar. 8, 2021

(65) Prior Publication Data
US 2021/0306966 A1    Sep. 30, 2021

(30) Foreign Application Priority Data

Mar. 6, 2020 (UA) ............................... a 2020 01610

(51) Int. Cl.
*H04W 56/00* (2009.01)
*H04W 84/18* (2009.01)

(52) U.S. Cl.
CPC ........ *H04W 56/0015* (2013.01); *H04W 84/18* (2013.01)

(58) Field of Classification Search
CPC ... H04W 84/18; H04W 56/0015; H04W 4/38; H04W 56/001; H04B 7/2643;
(Continued)

(56) References Cited

U.S. PATENT DOCUMENTS

| 8,780,790 | B2 | 7/2014 | Sarkar |
| 10,313,989 | B2 | 6/2019 | Kashima |

(Continued)

FOREIGN PATENT DOCUMENTS

| CN | 106535138 B | 1/2020 | |
| KR | 20140056503 A | * 5/2014 | ........ H04W 72/0446 |

(Continued)

OTHER PUBLICATIONS

Leugner. Clock Synchronization compensating Drift, Offset and Compensation Delay, Jun. 2018 IEEE Xplore (Year: 2018).*

*Primary Examiner* — Robert J Lopata
(74) *Attorney, Agent, or Firm* — Saliwanchik, Lloyd & Eisenschenk

(57) ABSTRACT

The claimed group of inventions relates to method for enhancing a communication between security sensors and a transceiver within security alarm systems, which could improve an interaction between the transceiver and at least one sensor of the system by performing a real-time correction of its operation, by performing a control of synchronization parameters of the sensors, timely introduction of the corrected parameters and use of an accumulated data for self-correction of the synchronization parameters by the sensors. The implementation of the claimed methods reduces a probability of internal mutual interferences, provides a correct operation of the sensors, increases an autonomous operation time of the sensors and an overall stability of the security alarm systems.

13 Claims, 9 Drawing Sheets

(58) Field of Classification Search
CPC .. H04B 7/0608; H04B 7/0814; H04B 7/0817; H04B 7/12; G06F 15/16
USPC ........................................................ 370/347
See application file for complete search history.

(56) References Cited

U.S. PATENT DOCUMENTS 10,492,068 B1 * 11/2019 Konotopskyi ...... H04W 12/121
10,541,851 B2    1/2020 Malik et al.
2020/0396707 A1 * 12/2020 Merkel ................... G01S 15/74

FOREIGN PATENT DOCUMENTS

WO    WO-2004038959 A1 *  5/2004   ........... H04B 7/2696
WO    WO-2018/195965 A1   11/2018

* cited by examiner

METHOD FOR SYNCHRONIZING SENSORS OF A SECURITY SYSTEM (VARIANTS)

CROSS-REFERENCE TO RELATED APPLICATION

This application claims priority to Ukrainian Application No. a 2020 01610, filed Mar. 6, 2020, which is hereby incorporated by reference in its entirety.

FIELD OF THE INVENTION

The invention relates to wireless communication systems and it belongs to methods for enhancing communication between security sensors and a transceiver, which utilizes a bidirectional security sensor, in security alarm systems.

TERMINOLOGY USED IN THE APPLICATION

A slot is a channel allocation unit being a minimum time interval for data exchange within TDMA. The slot comprises time periods, each corresponding to a certain function.

A frame is a set of all slots (channels), which are available within the system.

A superframe or a super-frame comprises a set of two or more frames.

PRIOR ART

The prior art teaches a channel position indication method that is disclosed in the publication WO2018195965A1 dated Nov. 1, 2018, the method comprising the following: a network side device sends at least one indication information element that is adjusted to indicate a location offset between a data channel and a first control channel or between a second control channel and the first control channel, wherein the location offset includes a time domain location offset and/or a frequency domain location offset, and the time domain location offset is a symbol level offset.

Also, a synchronization method for a self-organizing time-division multi-access (TDMA) network is known, the method is described in the patent CN106535138B dated Jan. 7, 2020. The method comprises steps of receiving a broadcasting information regarding an adjacent node of a target node; an error of a synchronization step and a conflict of time intervals for transmitting target nodes and adjacent nodes may be processed by means of the received broadcasting information, while time intervals of the network frames and a time interval of the transmission are used to implement the synchronization.

Also, a wireless communication method is known, which is described in the U.S. Pat. No. 10,541,851B2 dated Jan. 21, 2020, the method comprising performing, by a base station, an access procedure to obtain access to a shared radio frequency spectrum band during a measurement window; generating a synchronization signal (SS) burst comprising a plurality of SS blocks; performing, by the base station, a first beam sweeping with the beam sweeping over the shared radio frequency spectrum based on the access procedure, wherein each SS block of the SS burst is transmitted during the first transmission using different transmission beams; wherein one of the first transmission, a second transmission by the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

The U.S. Pat. No. 8,780,790B2 dated Jul. 15, 2014 teaches a method for providing a wireless protocol, the method comprising steps of communicating to a transmission interval that facilitates switching between a downlink portion and an uplink portion of a wireless communication channel; and employing one or more guard intervals during the transmission interval to mitigate an overlap of transmitting frequencies between the downlink and uplink portions of the wireless communication channel, wherein the guard intervals include time reservations that are configurable automatically according to a detected application.

A method for providing a synchronization is known, the method is according to the U.S. Pat. No. 10,313,989B2 dated Sep. 4, 2019, the method comprising generating a control message having a format designated for resource allocation, wherein the control message includes a plurality of control fields; and reserving a value of one of the control fields to specify information other than information for resource allocation, the value indicating information about synchronization or information about starting a random access procedure, wherein the control message is transmitted over a control channel according to a lower layer protocol. The lower layer protocol includes a protocol L1, L2 or a medium access control (MAC) layer protocol.

Also, a method for long range communications using sensors with bidirectional communication capability, the method is disclosed in the U.S. Pat. No. 10,492,068B1 dated Nov. 26, 2019 and comprises installing a plurality of sensors configured to communicate with a central node configured to send and receive packets in working slots on two frequencies; selecting a frequency with the strongest signal from each particular sensor; and avoiding collisions between two-way sensors by changing working slots of the two-way sensors in each new frame by creating a super-frame comprising a plurality of ordinary frames; synchronizing several ordinary frames; returning the working slots to the initial position; creating a new super-frame; and changing a position of the working slot in the new super-frame. The bidirectional communication guarantees that the receipt will be confirmed and increases chances for receiving the signal. Therefore, it is possible to transmit the information in two directions, i.e. it is possible to record data (settings and other) within the sensors.

A drawback of this solution and the above-mentioned ones lies in that the sensors are unsynchronized over the time that affects the reliability of the communication system even when using extra-accurate quartzes in the sensors. Regardless of the accuracy of the quartzes, which are used in the sensors, in any case they differ from each other in terms of a frequency, thereby, over the time, the sensors are unsynchronized with the transceiver and operate incorrectly, and send their status to the transceiver, while they are not located in their slot, thereby leading to a probability of internal mutual interferences, e.g., in cases when said sensors interfere with sensors of adjacent devices of the system. Therefore, it is reasonable nowadays to develop a technology that could enable to achieve a correct operation of the sensor, wherein it must be located within its slot and preserve its position within the slot even with consideration of a maximum time exceeding relative to a beginning of the slot that usually equals to +20 ms.

SUMMARY OF THE INVENTION

The invention is based on a task to develop a method for synchronizing sensors with a central transceiver that could enable a continuous control of the synchronization parameters of each sensor during an information exchange with the transceiver, and, in case the sensor goes beyond acceptable boundaries of the synchronization parameters, enable a correction and returning the sensor within the mentioned boundaries of the synchronization parameters by the transceiver. The posed task is resolved by creating a method, wherein the transceiver is implemented to indicate, to the sensor, a number of milliseconds for which the sensor runs ahead or behind the transceiver, based thereon the sensor adds or takes away the corresponding number of clock periods on the closest slot to its counter, thereby accelerating or decelerating a time passage during said slot, also, according to the method, the sensor memorizes and accumulates the introduced changes and corrects its parameters by itself, thereby minimizing a synchronization offset with the transceiver.

An achievable technical effect lies in a possibility of performing a real-time control of the synchronization parameters of the sensors, to introduce their corrections timely and to use the accumulated data for the self-correction of the synchronization parameters by the sensor, thereby reducing the probability of internal mutual interferences, increases an autonomous working time and stability of the system.

The posed task is resolved as follows.

A method for synchronizing sensors of a security system that comprises at least one sensor and transceiver using a TDMA technology, the method comprising:

sending a primary synchronization request by the sensor to the transceiver, replying, by the transceiver, to the sensor's request about the primary synchronization stating correct synchronization parameters: a frame number, a superframe number, a slot number and a sensor location within the slot, wherein the sensor position within the slot is set to be greater in time relative to a beginning of the slot, setting the synchronization parameters by the sensor, after parameters of the correct synchronization according to the TDMA layout are set, the sensor transmits its status to the transceiver, in reply, the transceiver sends current offsets of the sensor from an expected location within the TDMA layout in ms, based on the information received, forming a first synchronization correction, then the sensor, according to the TDMA layout, periodically sends its status to the transceiver, the transceiver sends data regarding its synchronization correction in reply to the sensor status, starting from a second correction, the sensor memorizes information from three successive corrections, defines a size of the offset in time within the slots, calculates a specific synchronization offset for one slot and defines a correction factor, after each 4th correction, the sensor defines a subsequent correction factor and adds the same to the current one.

According to another aspect of the method implementation, the correction factor is introduced into a clock rate of the sensor into each 80th slot.

According to another aspect of the method implementation, the sensor position within the slot is set to be 20 ms greater relative to the beginning of the slot.

According to another aspect of the method implementation, it implies performing at least one further sending of the synchronization parameters by the sensor to the transceiver after the first setting of the synchronization parameters.

According to another aspect of the method implementation, the synchronization correction according to the statuses is sent to the sensor in a constant fashion.

According to another aspect of the method implementation, the synchronization is not corrected, when the sensor offset is within ±5 ms.

According to another aspect of the method implementation, if the sensor offset is within ±5 ms, a null value will be sent as data regarding the sensor synchronization correction.

The posed task is also resolved in such a way that in the method for synchronizing sensors of the security system, the sensor sends the primary synchronization request to the transceiver, the transceiver sends the reply to the sensor's request about the primary synchronization stating correct synchronization parameters: a frame number, a superframe number, a slot number and a sensor location within the slot, wherein the sensor position within the slot is set to be +20 ms relative to a beginning of the slot, setting the received synchronization parameters by the sensor, after the correct synchronization according to the TDMA layout is set, the sensor transmits its status to the transceiver, in reply, the transceiver sends current offsets of the sensor from an expected location within the TDMA layout in ms, based on the information received, forming a first synchronization correction, then the sensor, according to the TDMA layout, periodically sends its status to the transceiver, the transceiver sends data regarding its synchronization correction in reply to the sensor status, performing an additional correction by using a command CheckSynchro that is not associated with the TDMA layout and the frame length, when using the command CheckSynchro, the transceiver processes the sensor request and sends an information regarding the additional synchronization correction thereto, the transceiver sends the synchronization correction at the sensor request under the proviso that the sensor location offset is within ±20 ms, According to another aspect of the method implementation, the sensor sends a request for the command CheckSynchro to the transceiver, the transceiver sends the synchronization correction according to the command CheckSynchro to the sensor with a 60 ms offset relative to the beginning of the slot.

According to another aspect of the implementation of the claimed method, the synchronization correction according to the command CheckSynchro consists of at least four cycles.

According to another aspect of the implementation according to the second embodiment of the method, upon completion of 12 positive attempts, the additional synchronization correction according to the CheckSynchro mechanism is terminated.

According to another aspect of the implementation according to the second embodiment of the method, upon completion of 10 successive attempts with no reply, the additional synchronization correction according to the CheckSynchro mechanism is terminated.

According to another aspect of the implementation according to the second embodiment of the method, the sensor, for the synchronization correction according to the CheckSynchro mechanism, sends additional commands to the transceiver through fixed time intervals, which constitute 15, 30, 60 seconds successively.

It shall be understood that the mentioned general description and the subsequent detailed description do not limit the claimed invention, rather they only explain the essence of the invention.

DETAILED DESCRIPTION

Figure 1:
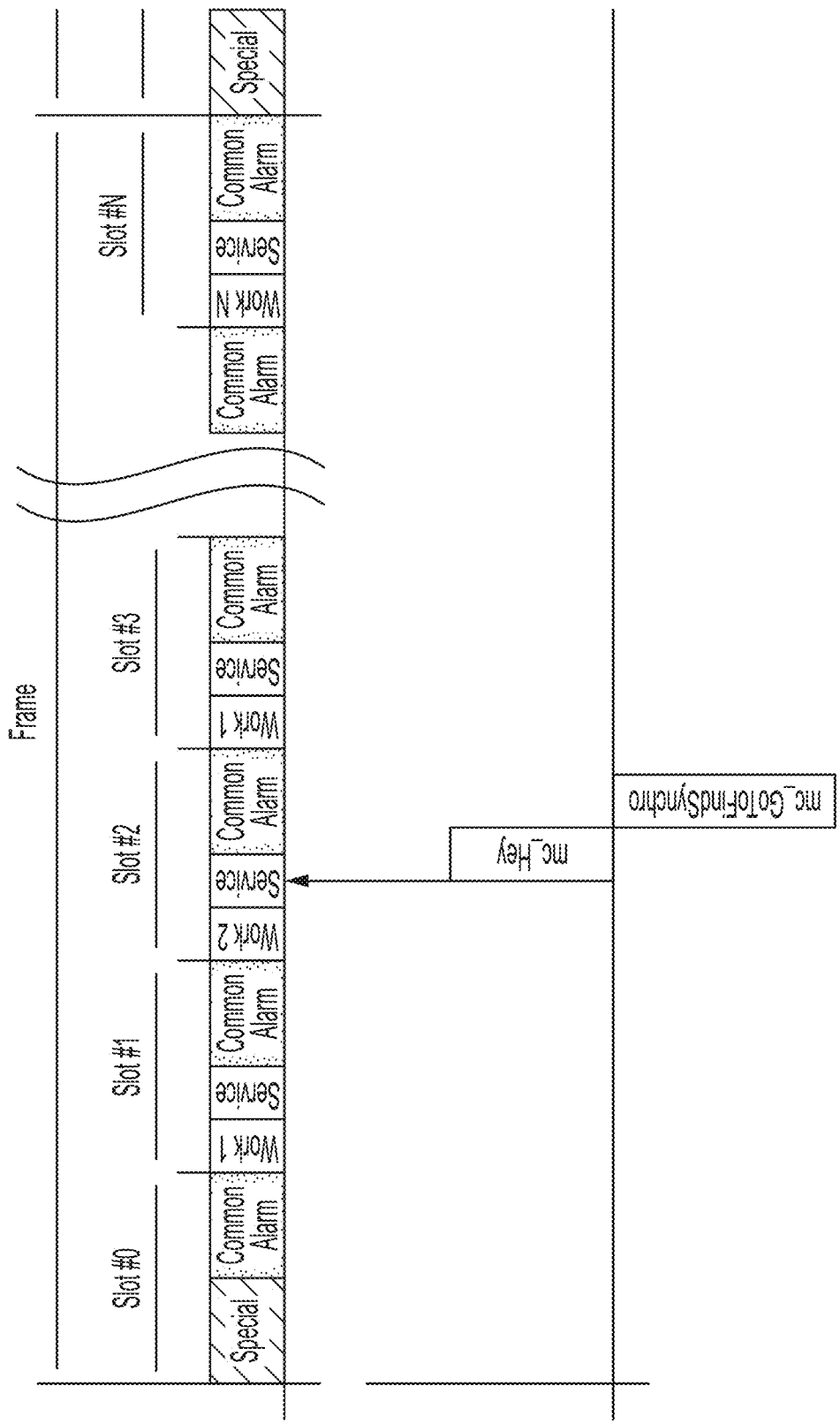
FIG. 1 is a flowchart of the process of the primary synchronization of the sensor.

FIG. 1 depicts the process of the primary synchronization of the sensor that is the beginning of the sensor operation. The sensor sends a request for the primary synchronization by a command "mc_Hey" to the transceiver, in reply to the sensor request, the transceiver sends a reply with an indication of current synchronization parameters: a frame number, a superframe number, a slot number and a sensor location within the slot, wherein the sensor position within the slot is set to be +20 ms relative to a beginning of the slot. Upon receipt of the current synchronization parameters, the sensor starts to send a command "mc_MoveStatus" with its status to the transceiver. If the transceiver receives incorrect commands with the status from the sensor, namely, the current synchronization parameters do not coincide with correct values received by the sensor during the primary synchronization, the transceiver will forcibly send a re-synchronization reply with a command "mc_GoToFindSynchro" to the sensor. There may be two reasons for the incorrect synchronization:

the sensor has entered a slot that is not its own.

Figure 2:
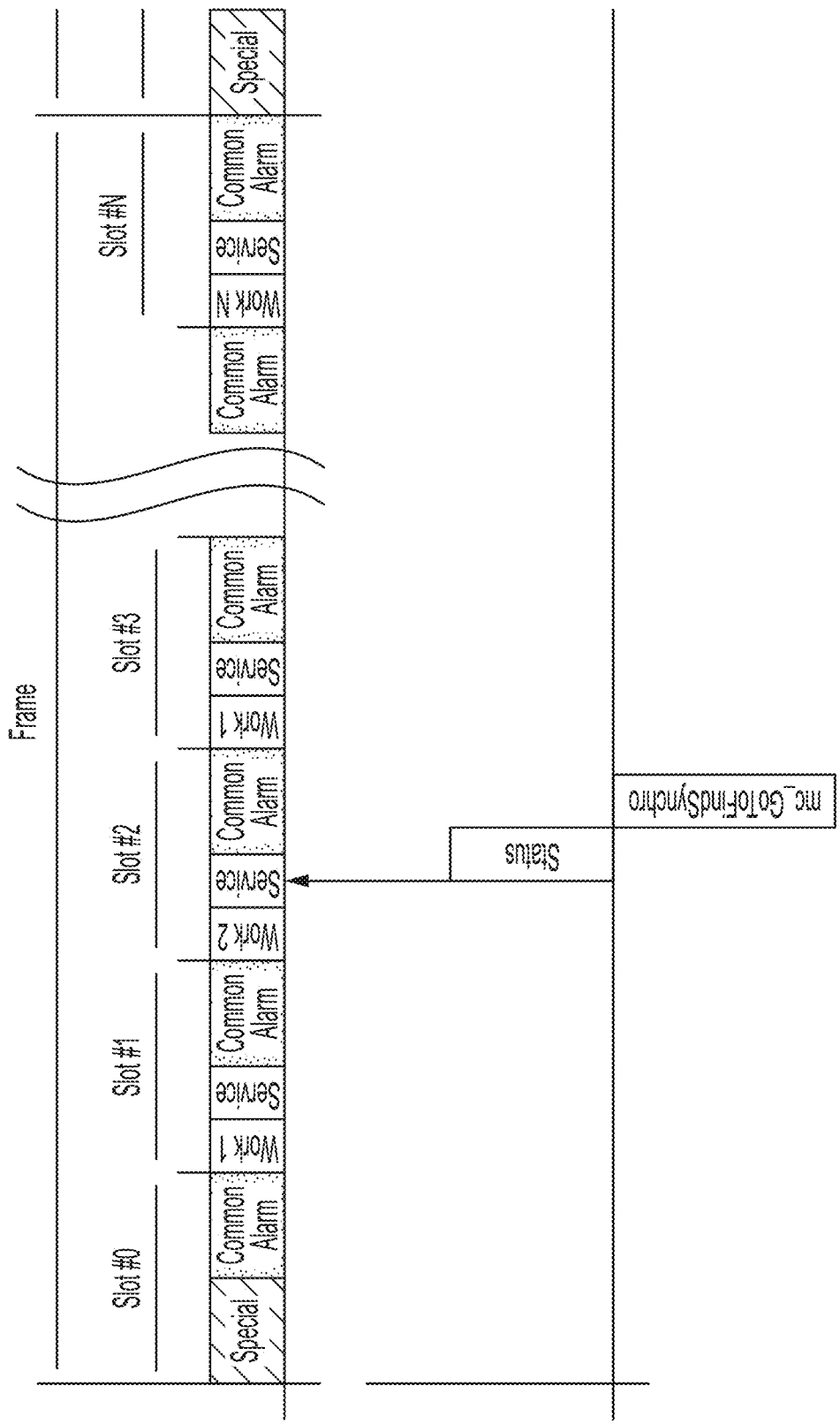
FIG. 2 is a flowchart of the process of the re-synchronization in case of the primary synchronization error.

The slot of the sensor does not coincide with an expected one when requesting the primary synchronization (a synchronization error) (FIG. 2). In reply to the received command "mc_MoveStatus" with the status from the sensor, the transceiver forcibly sends the re-synchronization reply with the command "mc_GoToFindSynchro" to the sensor.

the sensor falls into its own slot, but it offsets continuously.

Figure 3:
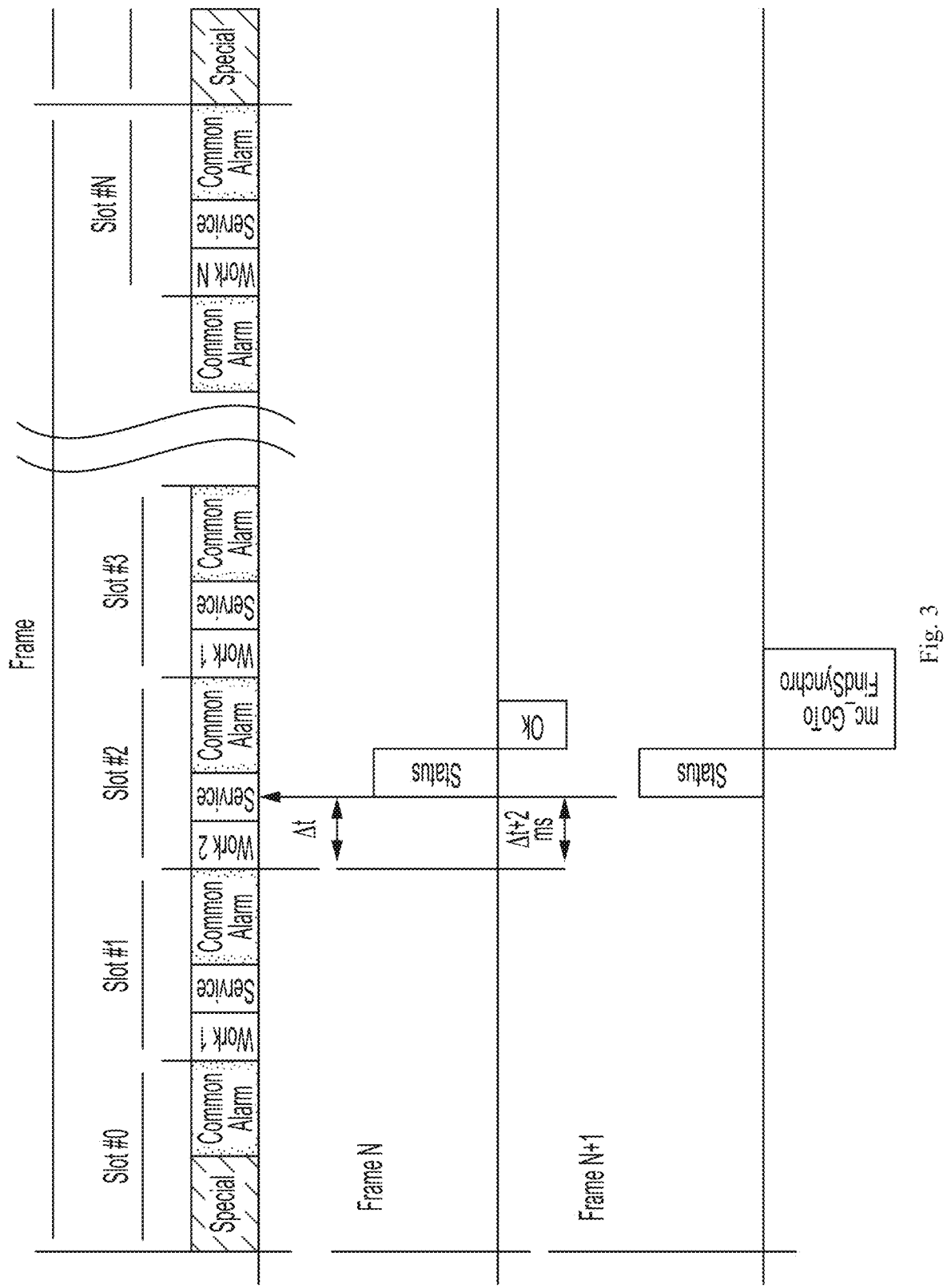
FIG. 3 is a flowchart of the process of the re-synchronization in case of a syntactical error in the synchronization.

The sensor falls into its own slot, however with a Δt time offset beyond acceptable synchronization boundaries. The transceiver fixes that the sensor operates with the same Δt+2 ms time offset during two successive frames, which is illustrative of the situation that the sensor highly likely has gone wrong from the synchronization parameters. In reply to its request, the transceiver sends the re-synchronization command "mc_GoToFindSynchro" (a syntactical error of the synchronization). (FIG. 3). The re-synchronization according to the command "mc_GoToFindSynchro" is carried out until the sensor begins to operate correctly. A format of the commands and replies to the commands is stated below.

mc_Hey is a command to request an information regarding the synchronization. Commands, according to which the re-synchronization may occur:

mc_CheckSynchro is a rectification of the synchronization, mc_MoveStatus is a sending of the status by the sensor, mc_GoToFindSynchro are commands for the re-synchronization.

Upon receipt of the re-synchronization command, the sensor immediately puts "a flag" that it is necessary to send versions of a full status and an expanded status. Also, according to this command, the sensor resets previous results of the synchronization and starts the synchronization rectification command "CheckSynchro" from the beginning. Upon establishment of the correct synchronization according to the TDMA layout, the sensor starts to transmit its status to the transceiver.

Figure 4:
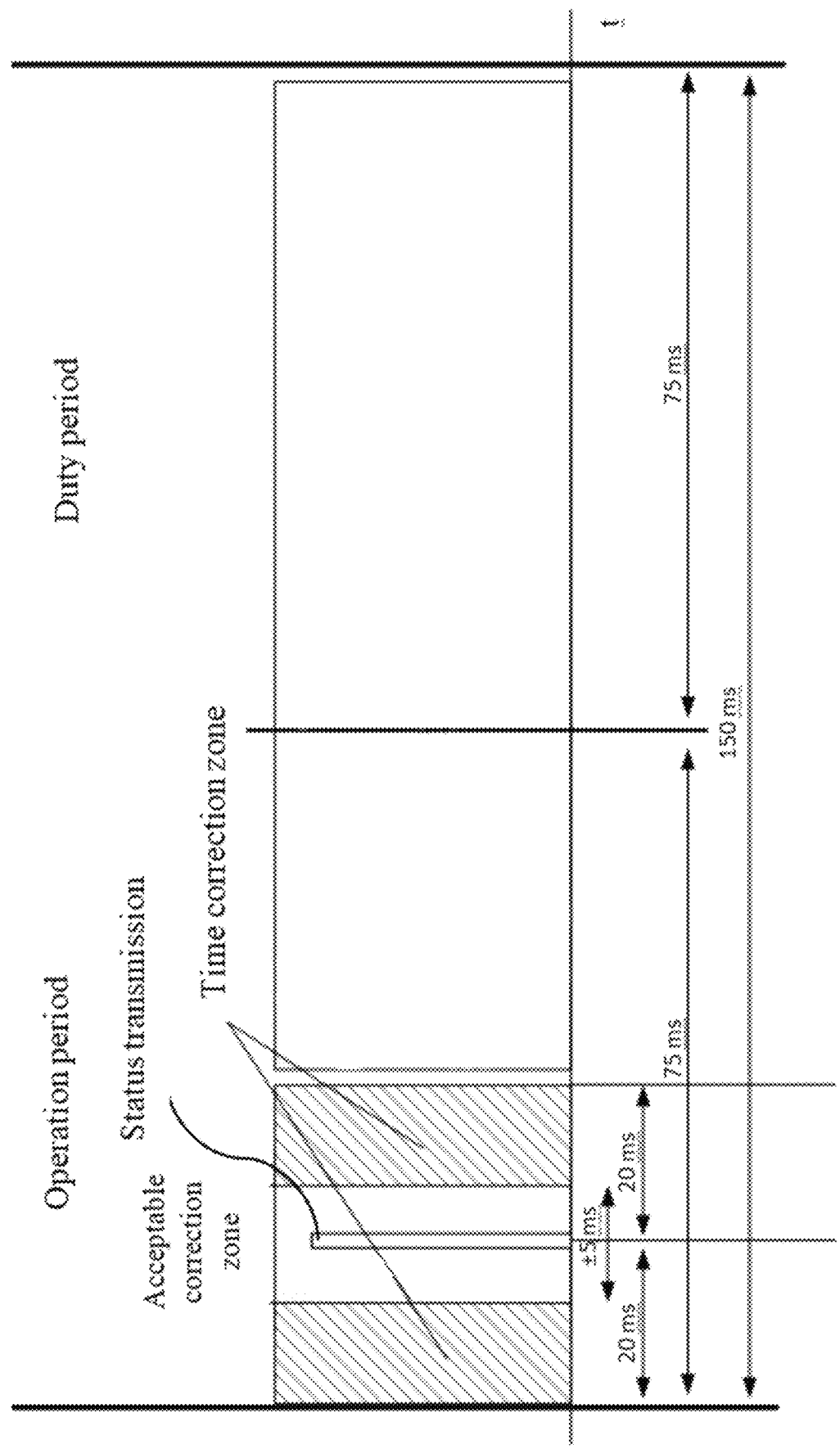
FIG. 4 is a flowchart of the process of the synchronization correction according to statuses.

FIG. 4 depicts a slot length in time and a location of the sensor within the slot. FIG. 4 illustrates the process of the synchronization correction of the sensor according to statuses. The sensor transmits the command "mc_MoveStatus" that comprises data regarding its current status to the transceiver, in reply, the transceiver sends current offsets of the sensor from an expected location within the TDMA layout in ms. A frequency and a time of sending the sensor status to the transceiver are associated with the TDMA layout. An offset of the sensor synchronization within boundaries ±5 ms is considered to be acceptable and is not corrected. When the sensor offset is more than ±5 ms, but less than ±20 ms, the sensor must be corrected, in the reply to each command mc_MoveStatus with the offset status, the transceiver sends information regarding a degree and a direction of the offset from the synchronization parameters to the sensor. The time correction zone is within ±20 ms. An offset for the given synchronization parameters for more than ±20 ms shall not be corrected for two reasons: when the sensor offsets by −20 ms, it will fall to a slot that is not its own, upon receipt of such status from the sensor, the transceiver will send the re-synchronization command in reply. When the sensor offsets by +20 ms, the suggestion regarding the offset from the synchronization parameters will become ambiguous, since a repeat of the status also may appear in this location, and the repeats are not marked in any way, they can be distinguished by the offset only. If the offset from the synchronization parameters is less than ±5 ms, the value 0 will be sent as the sensor correction.

Therefore, the correction is made only according to the first attempt of sending the status, a correction is formed based thereon, and the correction is in turn included into the formed package of the reply to the sensor request for its own status according to the command "mc_MoveStatus".

Formats of the reply by the transceiver to the sensor are mentioned below:

| Command | Data[0] | Data[1] | Data[2] | Data[3] | Data[4] |
|---------|---------|---------|---------|---------|---------|
| mc_OK | AnswerFactor | PowerCom | PowerAjust | TimeCorr | SystemError | mc_OK is a positive reply to the status delivery from the sensor,

AnswerFactor is a flag change that comprises sensor indications,

PowerCom, PowerAjust are data to control the sensor power,

TimeCorr is a time correction value in ms that must not exceed the value of ±20 ms, SystemError is a field of system errors.

The sensor receives regular corrections from the transceiver and calculates an average rate of the offset from the synchronization parameters. It operates as follows. Upon the primary synchronization, the correction factor has a null value, and a process for its determination begins. The value of each correction is added to an accumulated sum, the first correction after the primary synchronization is not considered, since the positioning within the slot according to the synchronization information is rather coarse and significantly exceeds the accuracy in 1 ms that may give an erroneous result. Starting from the second correction, the sensor collects the information from three successive corrections, determines a time and a size of the offset from the synchronization parameters within the slots, calculates the specific offset from the synchronization parameters for one slot, forms a correction factor that is introduced into the clock rate into each 80th slot, and starts the correction factor specification process again. Upon 4 corrections, a regular, more accurate correction factor will be obtained that will be considered and added to the current correction factor.

Figure 5:
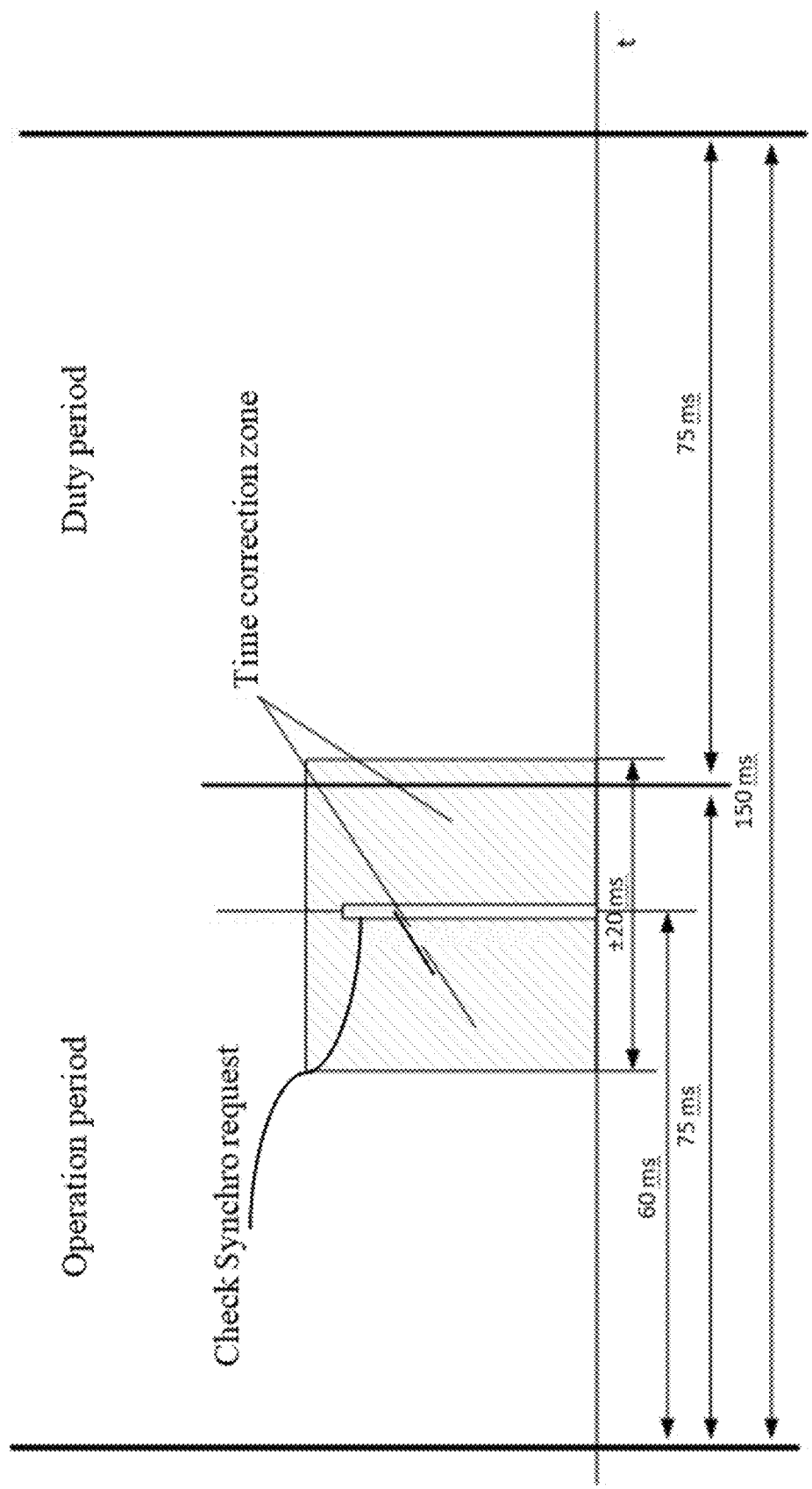
FIG. 5 is a flowchart of the synchronization process according to the CheckSynchro mechanism.

FIG. 5 shows a slot length in time and a location of the sensor within the slot. FIG. 5 illustrates the flowchart of the synchronization process according to the mechanism "CheckSynchro", use of this mechanism enables to carry out an additional correction of the synchronization parameters. The synchronization according to the mechanism "CheckSynchro" is not associated with the TDMA layout and the frame length, rather it is carried out within fixed time intervals, which constitute 15, 30, 60 seconds successively. The transceiver always replies to the requests from the sensor according to the mechanism "CheckSynchro" and forms a reply thereto with no checking whether the sensor has fallen within its own slot, since the commands according to the mechanism "CheckSynchro" are sent within certain time intervals, rather than within a dedicated space within the frame. When using long frames (3 min and more), data received by the sensor according to the mechanism "CheckSynchro" is processed in the same way as according to the statuses, thereby enabling to receive a preliminary correction express-factor prior to sending the first status by the sensor to the transceiver. If short frames (12 sec and more) are used, the data received according to the mechanism "CheckSynchro" is added to the data received according to the statuses, thereby enabling the sensor to receive the first correction factor faster. In reply to the request of the command "CheckSynchro" from the sensor, the transceiver sends the synchronization correction according to the command "CheckSynchro" to the sensor with the offset by 60 ms relative to the beginning of the slot, it is made to avoid making a disturbance for other sensors when they send statuses to the transceiver. When using the mechanism "CheckSynchro", the time correction zone is within ±20 ms as when performing the correction according to the statuses.

Figure 6A:
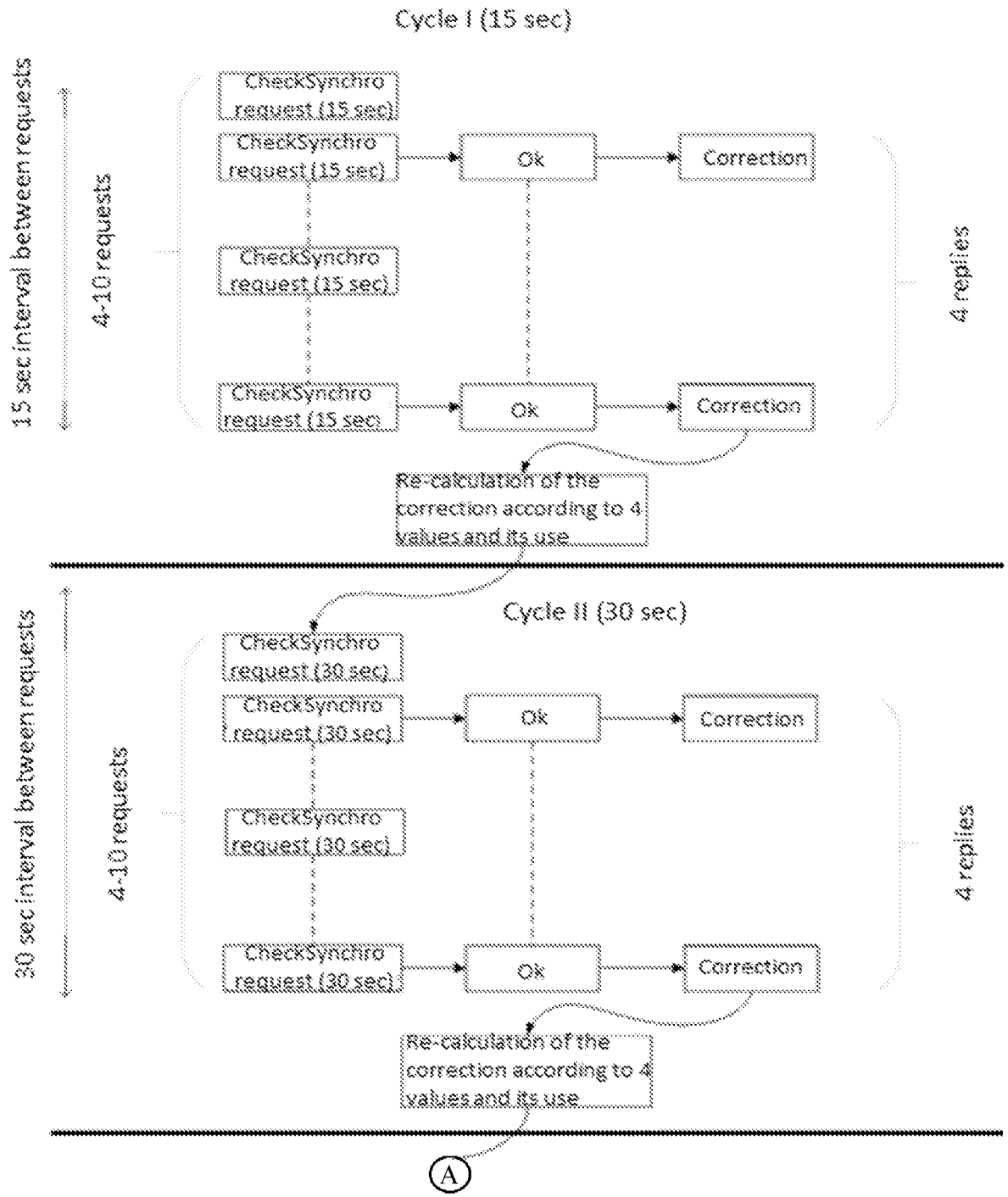
FIGS. 6A and 6B are logical diagrams of the synchronization process according to the CheckSynchro mechanism.
Figure 6B:
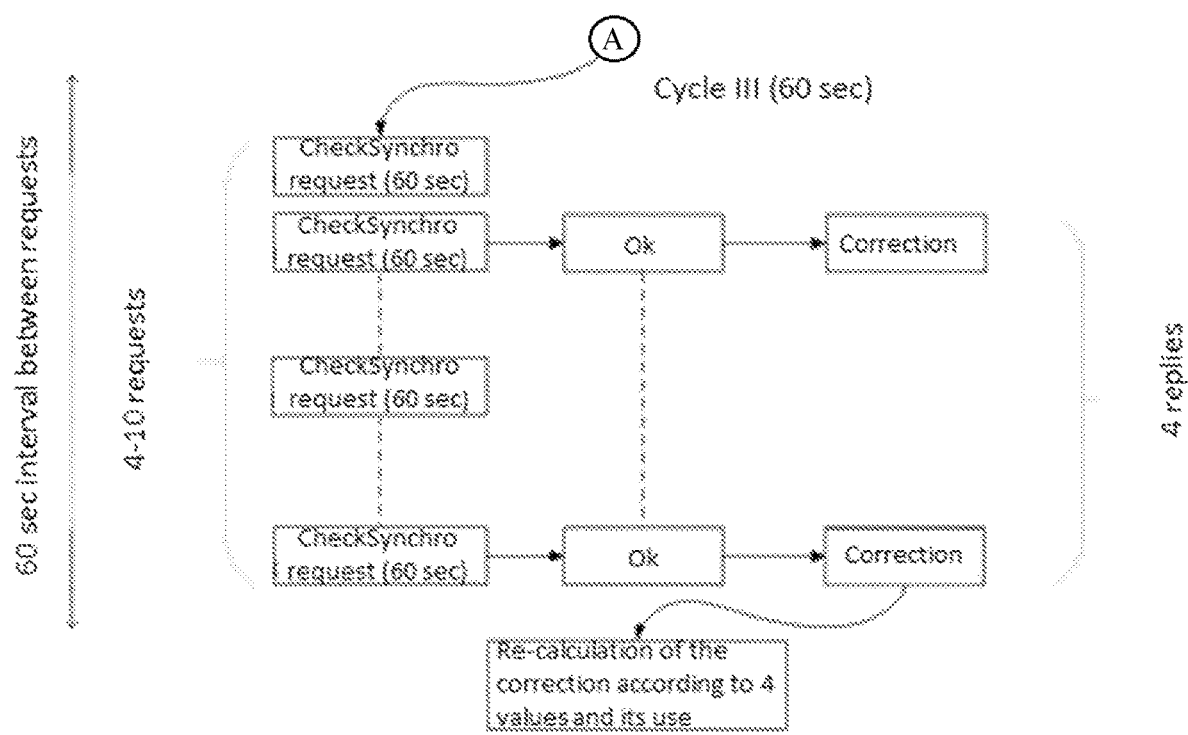

FIGS. 6A and 6B depict a logic of the synchronization process according to the mechanism "CheckSynchro". The correction according to the mechanism "CheckSynchro" consists of 3 cycles, which are different in time. The sensor sends the request for the correction according to the mechanism "CheckSynchro" to the transceiver, and at least 4 requests are sent with each cycle. In the first cycle, the sensor sends at least 4 requests for the correction according to the mechanism "CheckSynchro" to the transceiver with the interval of 15 sec. The transceiver forms at least 4 replies with the correction factors, and a recalculation of the synchronization correction is performed on the basis of the received data. The sensor receives a revised correction factor. The second and third correction cycles according to the mechanism "CheckSynchro" are carried out according to the same scheme, while the difference lies only in that the interval between the sensor requests in the second cycle is 30 sec, while the interval between the requests in the third cycle is 60 sec respectively.

Therewith, the replies of the transceiver to the sensor have a format that is mentioned below:

| Command | Data[3] |
|---|---|
| mc_OK | SynchroDelay | mc_OK is a positive reply to the status delivery from the sensor,

SynchroDelay is a value of the offset from the synchronization parameters in milliseconds, and it must not exceed the value of ±ms.

Figure 7:
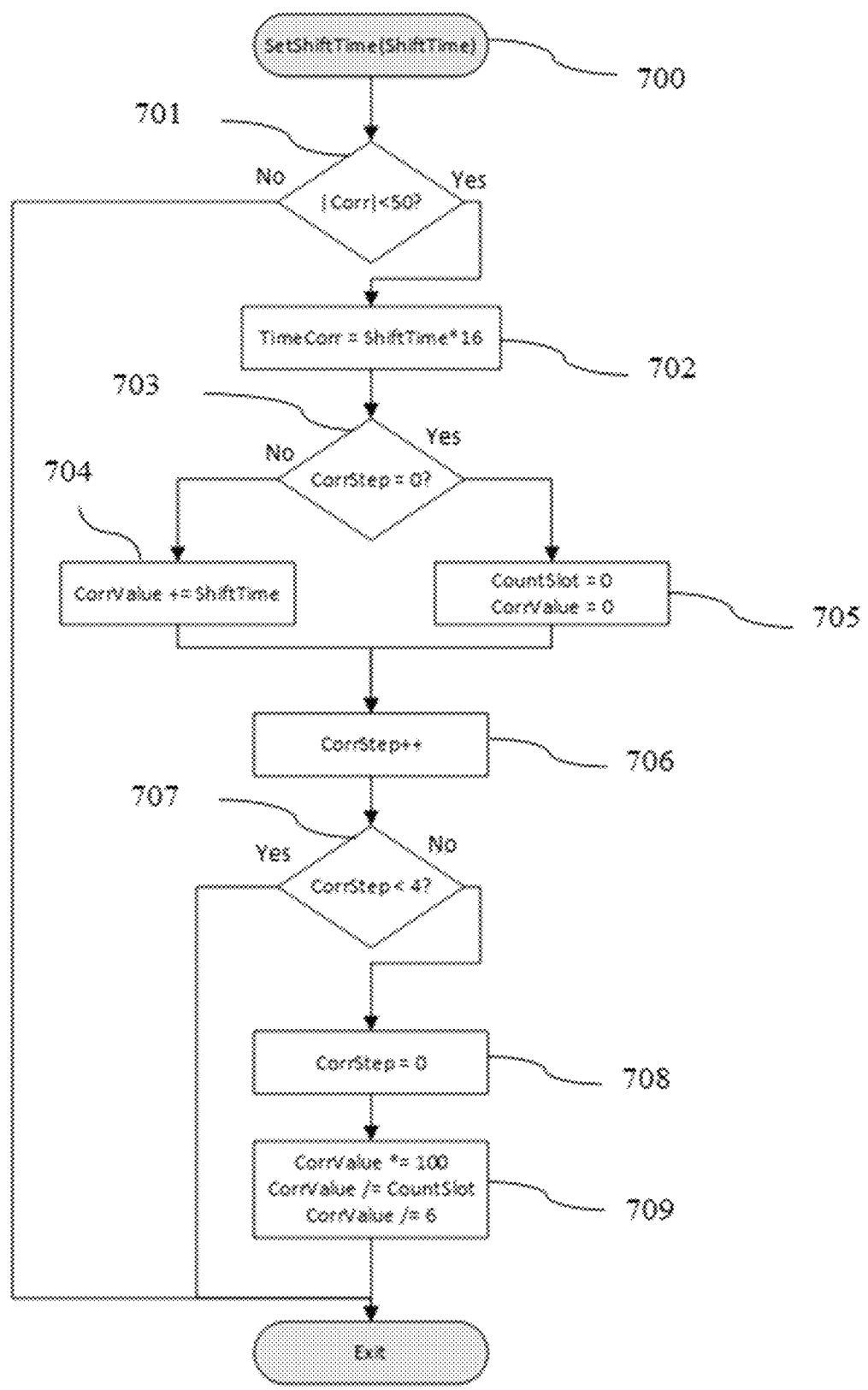
FIG. 7 is a diagram of the algorithm of the correction processing by the sensor.

FIG. 7 depicts the algorithm of the synchronization correction processing by the sensor that lies in the following. The correction processing starts from a request "Set shift time" 700, at a step 701, wherein a correction size is checked by means of a variable "con <50?" that functions as a guard against large correction values, which could affect the correct operation of the sensor. If the correction value exceeds the given value, the process will terminate at the step 701. In case of acceptable values of the corrections, each correction will be introduced by means of a variable "Time Corr" at a step 702. At steps 703, 704, 705, by means of variables "Corr Step=0", "CorrValue+=Shift Time", "Count Slot=0", "Corr Value=0", the first correction is removed, since it is a result of the primary synchronization and has a low accuracy. At a step 706, a variable "Corr Step++" introduces next corrections, which are added to the accumulated resulting sum of the corrections, and time spent for the accumulation of this sum is considered (the time is taken in slots or in several-fold intervals of the slots), and the correction factor is calculated. At a step 707, a number of the corrections is checked by means of a variable "Corr Step<4?", and in case of each fourth correction, the correction factor is re-calculated and the cycle is restarted in order to reveal a new correction factor. The obtained new correction factor is to be used in next four corrections, which will come from the sensor. Next cycles for revising the correction factor will be carried out with consideration of values of the previous correction factors for its further revision. At steps 708 and 709, a process of fixation of the correction factor by the sensor is performed in order to use the synchronization correction.

Upon receipt of the synchronization correction command, the sensor memorizes the correction size and the time passed after the previous correction. According to several successive correction, preferably three, the sensor calculates an average offset from the synchronization parameters within a single slot and determines the correction factor that subsequently will be constantly introduced into a clockspeed generator of the sensor in order to compensate for its offset from the synchronization parameters. The first correction is not considered, since it is a result of the primary synchronization that has a low accuracy. From the second correction to the fourth, the correction factor and the time for its accumulation are accumulated. At the fourth correction, an average value of the correction factor is determined, this value is added to the one that already exists and the cycle starts from the beginning. The correction that is sent by the transceiver includes the correction factor of the sensor received at the previous steps, wherein the correction factor is not changed, rather it is accumulated.

An example of the sensor correction without consideration of the mechanism "CheckSynchro", with the correction according to the statuses only, is mentioned below to demonstrate how the time is changed, when the sensor approaches the correction boundaries:
Synchronization (actual process)
3 min+10 ms8 min+10 ms7 min+10 ms
8 min+11 ms Termination of the first cycle, re-calculation of the correction factor
40 min 10 ms38 min 10 ms
37 min 10 ms38 min 10 ms Termination of the second cycle, revision of the correction factor 120 min 10 ms
96 min 10 ms80 min 10 ms
110 min 10 ms Termination of the third cycle . . .

Figure 8:
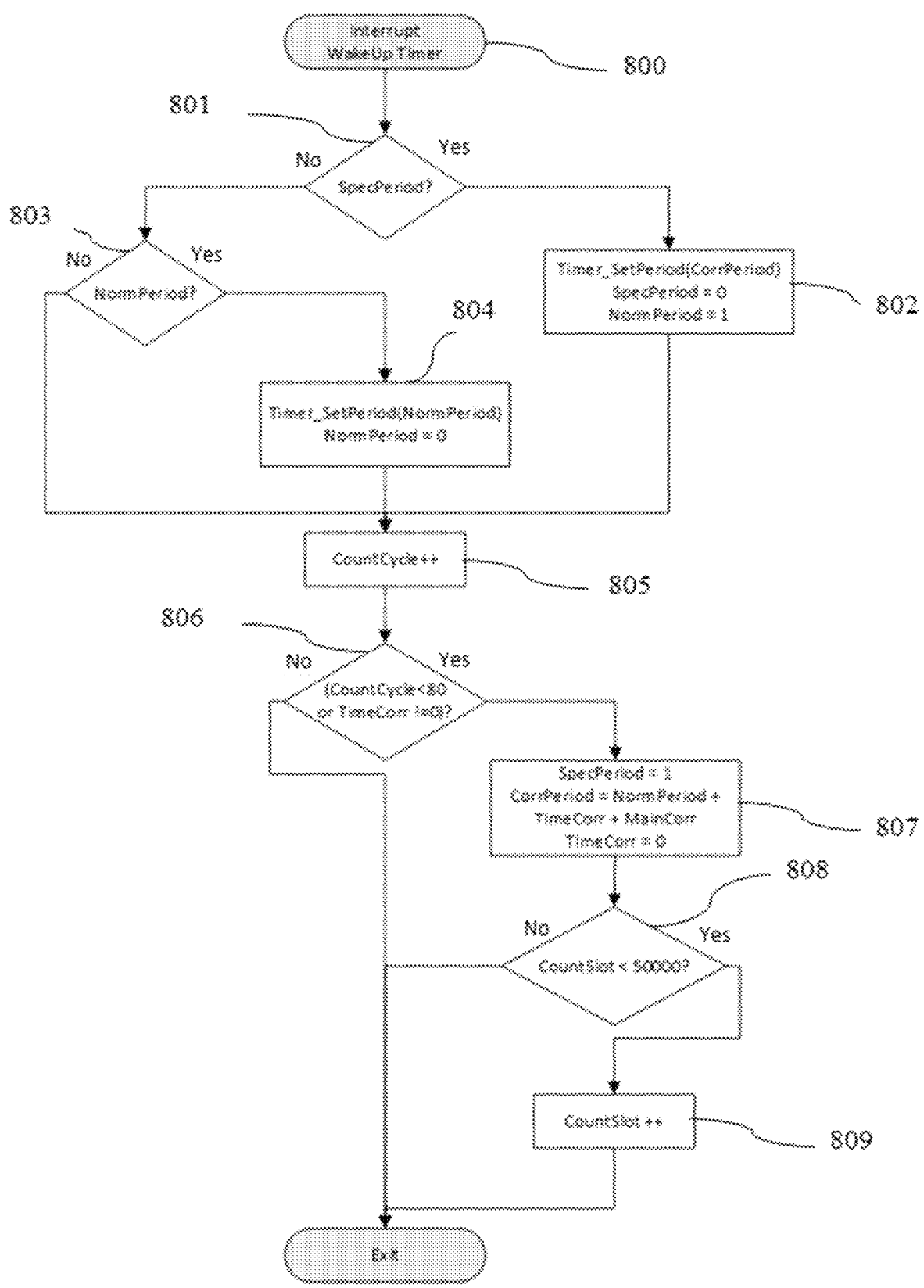
FIG. 8 is a diagram of the algorithm of the correction introduction into the sensor.

FIG. 8 depicts the algorithm for introducing the correction by the sensor.

Calculation of the interval between the corrections and introduction of the correction factor are carried out in an interrupted manner according to the command of the variable "WakeUp Timer".

At a step 800, the introduction of the correction factor starts according to the command from the variable "Interrupt WakeUp Timer", at a step 801, the variable "Spec Period=?" requests a ready status for the introduction of the correction factor. At a step 802, the variables "Timer_set Period (Corr Period)", "Spec Period=0", "Norm Period=1" set a "flag" that will indicate, during the next introduction of the correction factor, a time of its introduction (so-called normal period for the introduction of the correction factor). If the "flag" has been already set, a step 803 according to the variable "Norm Period?" and a step 804 according to the variables "Timer_se Period (Corr Period)", "Norm Period=0" will be performed immediately, at which the time of the introduction of the correction factor is indicated. At a step 805, a cycle of the introduction of the correction factor is indicated according to the variable "Count Cycle++". At a step 806, the correction factor is introduced into the cycle indicated at the step 805 according to the variables "(Count Cycle<80 or Time Corr !=0)". If the cycle of the correction factor does not coincide with the one indicated at the step 805, a steps 807 by means of the variables "Spec Period=1", "Corr Period=Norm Period+Time Corr+MainCorr", "Time Corr=0" and 808 by means of the variable "Count Slott<50000?", and a step 809 according to the variable "Count Slot++", at which the revision of the cycle for the introduction of the correction factor and its introduction are performed.

The correction factor is introduced into the clock rate of the sensor into each 80th slot (24 seconds). Such time for the introduction of the correction factor is selected to provide a certain sensitivity to numerical values being introduced, since at shorter time periods the numerical values are less than unity and will not be considered by the sensor, and on another hand, the selected time provides the introduction of the correction factor and the real-time control of the offset from the synchronization parameters. Therefore, the averaged correction factor that compensates for the sensor offset from the synchronization parameters is introduced into each 80th slot.

The invention claimed is:

1. A method for synchronizing a security system that comprises at least one sensor and transceiver using a TDMA technology, the method comprising:
    sending a primary synchronization request by the sensor to the transceiver,
    replying, by the transceiver, to the sensor's request about the primary synchronization stating correct synchronization parameters: a frame number, a superframe number, a slot number and a sensor location within the slot, wherein the sensor position within the slot is set to be greater in time relative to a beginning of the slot,
    setting the synchronization parameters by the sensor,
    after the correct synchronization parameters according to the TDMA layout are set, the sensor transmitting its status to the transceiver, in reply, the transceiver sending current offsets of the sensor from an expected location within the TDMA layout in ms,
    based on the information received, forming a first synchronization correction, then the sensor, according to the TDMA layout, periodically sending its status to the transceiver, the transceiver sending data regarding its synchronization correction in reply to the sensor status,
    starting from a second correction, the sensor memorizing information from three successive corrections, defining a size of the offset in time within the slots, calculating a specific synchronization offset for one slot and defining a correction factor,
    after each 4th correction, the sensor defining a subsequent correction factor and adding the same to the current one.

2. The method for synchronizing according to claim 1, wherein the correction factor is introduced into a clock rate of the sensor into each 80th slot.

3. The method for synchronizing according to claim 1, wherein the sensor position within the slot is set to be 20 ms greater relative to the beginning of the slot.

4. The method for synchronizing according to claim 1, wherein the sensor performs at least one further sending of the synchronization parameters to the transceiver after the first setting of the synchronization parameters.

5. The method for synchronizing according to claim 1, wherein the synchronization correction according to statuses is sent to the sensor in a constant fashion.

6. The method for synchronizing according to claim 1, wherein the sensor offset from the synchronization that is within ±5 ms is not corrected.

7. The method for synchronizing according to claim 1, wherein if the sensor offset is within less than ±5 ms, a null value will be sent as data regarding the sensor synchronization correction.

8. A method for synchronizing a security system that comprises at least one sensor and transceiver using a TDMA technology, the method comprising:
    sending a primary synchronization request by the sensor to the transceiver,
    sending a reply, by the transceiver, to the sensor's request about the primary synchronization stating current synchronization parameters: a frame number, a superframe number, a slot number and a sensor location within the slot, wherein the sensor position within the slot is set to be greater in time relative to a beginning of the slot,
    setting the received synchronization parameters by the sensor, after the correct synchronization according to the TDMA layout is set, the sensor transmitting its status to the transceiver, in reply, the transceiver sending current offsets of the sensor from an expected location within the TDMA layout in ms, based on the information received, forming a first synchronization correction, then the sensor, according to the TDMA layout, periodically sending its status to the transceiver, the transceiver sending data regarding its synchronization correction in reply to the sensor status, performing an additional correction by using a command CheckSynchro that is not associated with the TDMA layout and the frame length, wherein, when using the command CheckSynchro, the transceiver processes the sensor request and sends an information regarding the additional synchronization correction thereto, and the transceiver sends the synchronization correction at the sensor request under the proviso that the sensor location offset is within ±20 ms.

9. The method for synchronizing according to claim 8, wherein the sensor sends a request for the command CheckSynchro to the transceiver, the transceiver sends the synchronization correction according to the command CheckSynchro to the sensor with a 60 ms offset relative to the beginning of the slot.

10. The method for synchronizing according to claim 8, wherein the synchronization correction according to the command CheckSynchro consists of at least four cycles.

11. The method for synchronizing according to claim 8, wherein, upon completion of 12 positive attempts, the additional synchronization correction according to the CheckSynchro mechanism is terminated.

12. The method for synchronizing according to claim 8, wherein, upon completion of 10 successive attempts with no reply, the additional synchronization correction according to the CheckSynchro mechanism is terminated.

13. The method for synchronizing according to claim 8, wherein the sensor, for the synchronization correction according to the CheckSynchro mechanism, sends additional commands to the transceiver through fixed time intervals, which constitute 15, 30, 60 seconds successively.

* * * * *

UNITED STATES PATENT AND TRADEMARK OFFICE
CERTIFICATE OF CORRECTION

PATENT NO. : 11,483,787 B2
APPLICATION NO. : 17/194804
DATED : October 25, 2022
INVENTOR(S) : Oleksandr Mykolayovych Tantsiura et al.

Page 1 of 1

It is certified that error appears in the above-identified patent and that said Letters Patent is hereby corrected as shown below:

On the Title Page

"(12) United States Patent Mykolayovych et al." should read --(12) United States Patent Tantsiura et al.--

"(71) Applicants: Tantsiura Oleksandr Mykolayovych, Kyiv (UA); Piannikov Serhii Dmytrovych, Kyiv (UA); Konotopskyi Oleksandr Volodymyrovych, Sharjah (AE)" should read --(71) Applicants: Oleksandr Mykolayovych Tantsiura, Kyiv (UA); Serhii Dmytrovych Piannikov, Kyiv (UA); Oleksandr Volodymyrovych Konotopskyi, Sharjah (AE)--

"(72) Inventors: Tantsiura Oleksandr Mykolayovych, Kyiv (UA); Piannikov Serhii Dmytrovych, Kyiv (UA); Konotopskyi Oleksandr Volodymyrovych, Sharjah (AE)" should read --(72) Inventors: Oleksandr Mykolayovych Tantsiura, Kyiv (UA); Serhii Dmytrovych Piannikov, Kyiv (UA); Oleksandr Volodymyrovych Konotopskyi, Sharjah (AE)--

Signed and Sealed this
Twenty-sixth Day of November, 2024

Katherine Kelly Vidal
*Director of the United States Patent and Trademark Office*